United States Patent
Kim et al.

(10) Patent No.: US 11,124,229 B2
(45) Date of Patent: Sep. 21, 2021

(54) STEERING APPARATUS OF STEER-BY-WIRE SYSTEM

(71) Applicants: HYUNDAI MOTOR COMPANY, Seoul (KR); KIA MOTORS CORPORATION, Seoul (KR)

(72) Inventors: Min Jun Kim, Busan (KR); Young Dae Park, Asan-si (KR); Byung Rim Lee, Seongnam-si (KR); Sang Woo Hwang, Seoul (KR); Se Hyun Chang, Suwon-si (KR); Hyeon Seok Cho, Pyeongtaek-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 61 days.

(21) Appl. No.: 16/193,196

(22) Filed: Nov. 16, 2018

(65) Prior Publication Data
US 2020/0114960 A1 Apr. 16, 2020

(30) Foreign Application Priority Data
Oct. 11, 2018 (KR) .......................... 10-2018-0120862

(51) Int. Cl.
*B62D 5/00* (2006.01)
*B62D 6/00* (2006.01)
(Continued)

(52) U.S. Cl.
CPC .............. *B62D 6/008* (2013.01); *B62D 3/12* (2013.01); *B62D 5/005* (2013.01); *B62D 6/02* (2013.01); *F16H 25/2204* (2013.01)

(58) Field of Classification Search
CPC .......... B62D 6/008; B62D 3/12; B62D 5/005; B62D 6/02; F16H 25/2204
See application file for complete search history.

(56) References Cited

U.S. PATENT DOCUMENTS 3,289,797 A * 12/1966 Brzezinski .............. F16D 65/12
  188/171
6,176,208 B1 * 1/2001 Tsuzuki .................. F01L 1/462
  123/90.11

(Continued)

FOREIGN PATENT DOCUMENTS

JP 2004-231054 A 8/2004
JP 2004231054 A * 8/2004

(Continued)

OTHER PUBLICATIONS

Susan Finger (Figure 5-13a, "5.2.6 Slider-Crank Mechanism," https://www.cs.cmu.edu/~rapidproto/mechanisms/chpt5.html#HDR78, in "Rapid Design through Virtual and Physical Prototyping" (course syllabus) https://www.cs.cmu.edu/~rapidproto/home.html), Carnegie Mellon University, Spring 2010.*

(Continued)

*Primary Examiner* — Donald J Wallace
*Assistant Examiner* — Daniel M. Robert

(57) ABSTRACT

A steering apparatus of a steer-by-wire (SBW) system includes a structure for changing the frictional force of the system and a structure for limiting the rotation range of a steering wheel. The steering apparatus includes: a shaft rotatably interlocked with a steering wheel, a friction member surrounding the shaft and contacting the shaft, a frictional force provision device for narrowing and widening the friction member in the radial direction of the shaft to change the frictional force of the friction member that contacts the shaft, and a steering limitation device for regulating the rotation of the shaft using a stopper provided at the friction member during the rotation of the shaft to limit the steering of the steering wheel.

11 Claims, 6 Drawing Sheets

(51) Int. Cl.
*B62D 3/12* (2006.01)
*B62D 6/02* (2006.01)
*F16H 25/22* (2006.01)

(56) References Cited

U.S. PATENT DOCUMENTS

| | | | |
|---|---|---|---|
| 7,257,475 | B2 | 8/2007 | Asaumi et al. |
| 2009/0278067 | A1* | 11/2009 | Voss .................. B60T 8/363 |
| | | | 251/129.15 |

FOREIGN PATENT DOCUMENTS

| | | | |
|---|---|---|---|
| JP | 2004-322808 A | | 11/2004 |
| JP | 2004322808 A | * | 11/2004 |
| JP | 2004359011 A | * | 12/2004 |
| JP | 2006-076339 A | | 3/2006 |
| KR | 19990028775 U | * | 7/1997 |
| KR | 19990028775 U | * | 7/1999 |
| KR | 10-2004-0017349 A | | 2/2004 |
| KR | 10-2008-0004177 A | | 1/2008 |
| KR | 20080088075 A | * | 10/2008 |
| KR | 20180018125 A | * | 2/2018 |
| KR | 10-1858352 B1 | | 5/2018 |
| WO | WO-2007038528 A1 | * | 4/2007 .......... B62D 11/006 |

OTHER PUBLICATIONS

HarishReddy Parinam. "Inversion of Four Bar Chain," Dec. 5, 2017, http://www.mechanicaleducation.com/2017/12/inversion-of-four-bar-chain.html.*
Dante Ros, "An Introduction to Solenoids,"Apr. 11, 2017, https://www.fictiv.com/articles/an-introduction-to-solenoids (Year: 2017).*
YouTube video entitled "ServoCity Products: Lead Screws and Nuts," uploaded on Aug. 3, 2016 by user ServoCity. Retrieved from the Internet on Mar. 12, 2020 < https://www.youtube.com/watch?v=SwMngSTy4eo>) (Year: 2016).*
Susan Finger (Figure 5-13a, "5.2.6 Slider-Crank Mechanism," https://www.cs.cmu.edu/~rapidproto/mechanisms/chpt5.html#HDR78, in "Rapid Design through Virtual and Physical Prototyping" (course syllabus) https://www.cs.cmu.edu/~rapidproto/home.html), Carnegie Mellon University, Spring 2010. (Year: 2010).*
HarishReddy Parinam. "Inversion of Four Bar Chain," Dec. 5, 2017, http://www.mechanicaleducation.com/2017/12/inversion-of-four-bar-chain.html (Year: 2017).*

* cited by examiner

STEERING APPARATUS OF STEER-BY-WIRE SYSTEM

CROSS-REFERENCE TO RELATED APPLICATION

This application claims priority to and the benefit of Korean Patent Application No. 10-2018-0120862, filed on Oct. 11, 2018, the entire contents of which are incorporated herein by reference.

FIELD

The present disclosure relates to a steering apparatus of a steer-by-wire (SBW) system.

BACKGROUND

The statements in this section merely provide background information related to the present disclosure and may not constitute prior art.

An SBW system is a steering system having no mechanical connection between a steering wheel and the driving wheels of a vehicle. A rotation signal of the steering wheel is input to an electronic control unit (ECU), and a steering motor connected to the driving wheels of the vehicle is operated based on the input rotation signal, whereby the vehicle is steered.

The SBW system has advantages in that freedom of layout is increased based on the structure of the steering system, fuel economy is improved, and disturbance reversely input from the driving wheels of the vehicle is removed, since the SBW system does not have a structure for the mechanical connection between the steering wheel and the driving wheels, unlike a conventional steering system.

However, the SBW system has a disadvantage in that desired steering information cannot be sufficiently fed back to a driver due to the absence of the mechanical connection structure.

For example, in the conventional steering system, it is not necessary to generate steering reaction force thanks to a mechanical connection structure including, for example, a universal joint. In the SBW system, however, it is desired to generate steering reaction force or restoring reaction force using a motor, since the SBW system has no mechanical connection structure.

Furthermore, in the conventional steering system, the frictional force of the system is 3 Nm, which is relatively high. In contrast, the SBW system is a low-friction system, in which the frictional force of the system is 0.5 Nm or less. When a driver releases the steering wheel, therefore, vibration may be generated due to the reaction torque of a reaction motor.

In addition, when the frictional force of the system is low, the steering wheel may be operated with very little force at the position at which the steering wheel is neutral (on center). For this reason, a predetermined level of frictional force is desired for system stabilization.

Meanwhile, in the conventional steering system, when one of the tires collides with a curbstone, whereby the tire reaches the turning limit thereof and is thus not turned any further, the steering wheel is not rotated. In the SBW system, however, the steering wheel may continue to be rotated even when one of the tires collides with a curbstone, since the SBW system has no mechanical connection structure.

We have discovered that the SBW system can be more improved by a technology capable of regularly limiting the rotational angle of the steering wheel.

The matters disclosed in this section are merely for enhancement of understanding of the general background of the present disclosure and should not be taken as an acknowledgment or any form of suggestion that the matters form the related art already known to a person skilled in the art.

SUMMARY

The present disclosure provides a steering apparatus of an SBW system in which a structure for changing the frictional force of the system and a structure for limiting the rotation range of a steering wheel are combined.

In one form of the present disclosure, the above and other objects can be accomplished by the provision of a steering apparatus of an SBW system including: a shaft rotatably interlocked with a steering wheel, a friction member configured to surround the shaft and to contact the shaft; a frictional force provision means for narrowing and widening the friction member in the radial direction of the shaft to change the frictional force of the friction member that contacts the shaft; and a steering limitation means for regulating the rotation of the shaft using a stopper provided at the friction member during the rotation of the shaft to limit the steering of the steering wheel.

The frictional force provision means may include a tightening means connected to opposite ends of the friction member, one end of the tightening means being moved in the state in which the other end of the tightening means is fixed in order to narrow and widen the friction member, and a friction actuator for providing force desired to move the one end of the tightening means.

The tightening means may include a ball screw mechanism connected to opposite ends of the friction member, and the ball screw mechanism includes a screw configured to rotate, and a nut configured to move linearly in response to the rotation of the screw. A support of the ball screw mechanism may be connected to one end of the friction member, and the nut of the ball screw mechanism may be connected to the other end of the friction member, whereby the nut moves linearly in response to the rotation of the screw to change the frictional force of the friction member that contacts the shaft.

The friction actuator may include a first solenoid including a movable iron core configured to move linearly when current is supplied to a coil of the first solenoid. A rack gear may be provided at the end of the movable iron core, and a pinion gear may be formed at the end of the screw, the rack gear and the pinion gear being engaged with each other such that the screw rotates in response to the linear movement of the movable iron core.

The first solenoid may include a fixed iron core provided in the center of the coil, and a return spring provided between the fixed iron core and the movable iron core to provide elastic restoring force to the movable iron core that has been moved toward the fixed iron core. In particular, the movable iron core moves linearly in the center of the fixed iron core.

The steering apparatus may further include a controller configured to determine whether to supply current to the coil of the first solenoid based on steering angle information of the steering wheel and a vehicle speed input thereto.

The controller is configured to: supply current to the first solenoid when the vehicle speed is equal to or greater than a first reference vehicle speed; and supply the current to the first solenoid when the vehicle speed is less than a second reference vehicle speed, which is less than the first reference vehicle speed.

The steering limitation means may include a rotation member having a center axially coupled to one end of the shaft such that the rotation member is rotatable with the shaft, the rotation member being located so as to face the friction member, a first stopper protruding from a predetermined radial position of the rotation member so as to be disposed around the shaft, and a second stopper protruding from the friction member toward the rotation member, the second stopper being located in the movement path of the first stopper to limit the movement of the first stopper.

A driving member may be coupled to a column to which the steering wheel is coupled, and the driving member and the rotation member may be gear-engaged with each other to realize a predetermined reduction ratio.

The movement path of the first stopper may be defined along the friction member, the second stopper may be movable toward the first stopper in the movement path of the first stopper, and the steering apparatus may further include an emergency stop actuator for providing force desired to move the second stopper.

The emergency stop actuator may include a second solenoid configured including a movable iron core configured to move linearly when current is supplied to a coil of the second solenoid. A stationary link may be connected to the end of the movable iron core of the second solenoid, one end of a rotary link may be connected to the end of the stationary link via a hinge structure, and the other end of the rotary link may be connected to the second stopper via a hinge structure such that the second stopper is movable in response to the linear movement of the movable iron core of the second solenoid.

The second solenoid may include: a fixed iron core provided in the center of the coil of the second solenoid, and a return spring provided between the fixed iron core and the movable iron core to provide elastic restoring force to the movable iron core that has been moved toward the fixed iron core. In particular, the movable iron core moves linearly in the center of the fixed iron core.

The friction actuator may include a first solenoid configured including a movable iron core configured to move linearly when current is supplied to a coil of the first solenoid, and the steering apparatus may further include a movable sensor provided at the middle of the movable iron core of the first solenoid, a stationary sensor provided inside the coil of the first solenoid, and a controller configured to supply t current to the coil of the second solenoid when the difference between the steering angle of the steering wheel and the steering angle of tires is equal to or greater than a predetermined value and when the stationary sensor senses the movable sensor as the result of the movement of the movable iron core of the first solenoid.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
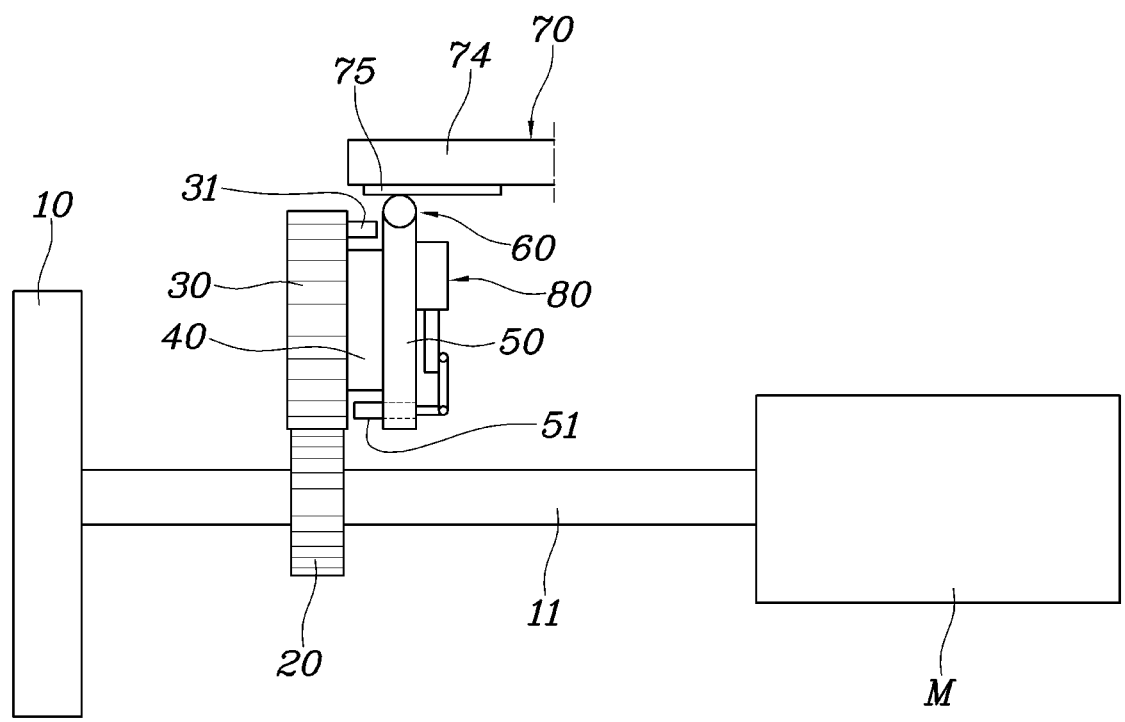
FIG. 1 is a view showing the structure of a steering apparatus of an SBW system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A steering apparatus of an SBW system in one form of the present disclosure includes a shaft 40, a friction member 50, and a frictional force provision means.

The present disclosure will be described in detail with reference to FIGS. 1 and 2. First, the shaft 40 is rotatably interlocked with a steering wheel 10. The shaft 40 may be rotatably interlocked with a column 11, which is rotated in response to the rotation of the steering wheel 10. Here, the steering wheel 10 is coupled to one end of the column 11, and a reaction motor M is mounted to the other end of the column 11, whereby steering reaction force is supplied to the steering wheel 10.

The friction member 50 is configured so as to have a shape that surrounds the shaft 40, and contacts the shaft 40.

The frictional force provision means narrows and widens the friction member 50 in the radial direction of the shaft 40 to change the frictional force of the friction member 50 that contacts the shaft 40.

A steering limitation means regulates the rotation of the shaft 40 using a stopper provided at the friction member 50 during the rotation of the shaft 40 to limit the steering of the steering wheel 10.

That is, according to the above structure, the frictional force applied to the shaft 40, which is rotatably interlocked with the steering wheel 10, in the state in which the shaft 40 contacts the friction member 50, is increased or decreased by the frictional force provision means. Under specific vehicle driving conditions, therefore, the steering sense of the steering wheel 10 may be adjusted so as to be light or heavy. In addition, during the rotation of the steering wheel 10, the rotation of the shaft 40 is regulated by the steering limitation means. Under specific vehicle driving conditions, therefore, the rotation of the steering wheel 10 is regulated.

In the present disclosure, a structure for providing variable frictional force to the steering wheel 10 and a structure for limiting the rotation range of the steering wheel 10 may be combined.

Meanwhile, the frictional force provision means includes a tightening means and a friction actuator.

Figure 2:
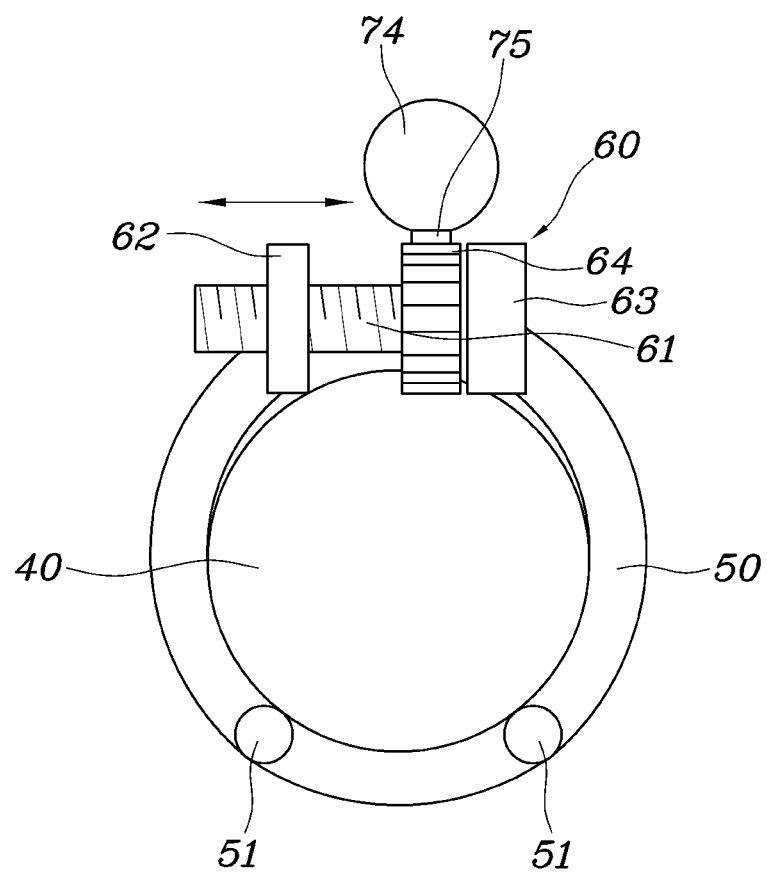
FIG. 2 is a view illustrating a friction-variable structure based on a ball screw mechanism in one form of the present disclosure.

Referring to FIG. 2, the tightening means is connected to opposite ends of the friction member 50. One end of the tightening means is moved in the state in which the other end of the tightening means is fixed in order to narrow or widen the friction member 50.

Specifically, the tightening means includes a ball screw mechanism 60, which is connected to opposite ends of the friction member 50 and is configured such that a nut 62 moves linearly in response to the rotation of a screw 61. For reference, the ball screw mechanism 60 has a structure that is robust to axial force such that the linear movement of the nut 62 is stably performed when the shaft 40 is rotated.

For example, a support 63 of the ball screw mechanism 60 may be connected to one end of the friction member 50, and the nut 62 of the ball screw mechanism 60 may be connected to the other end of the friction member 50 such that the nut 62 moves linearly when the shaft 40 is rotated to change the frictional force of the friction member 50 that contacts the shaft 40.

In other words, the screw 61 may extend through the support 63, and the support 63 and the screw 61 may be supported by a bearing structure disposed therebetween. Consequently, the support 63 is not rotated even when the screw 61 is rotated, and therefore the friction member 50 may be connected to the support 63.

Figure 3:
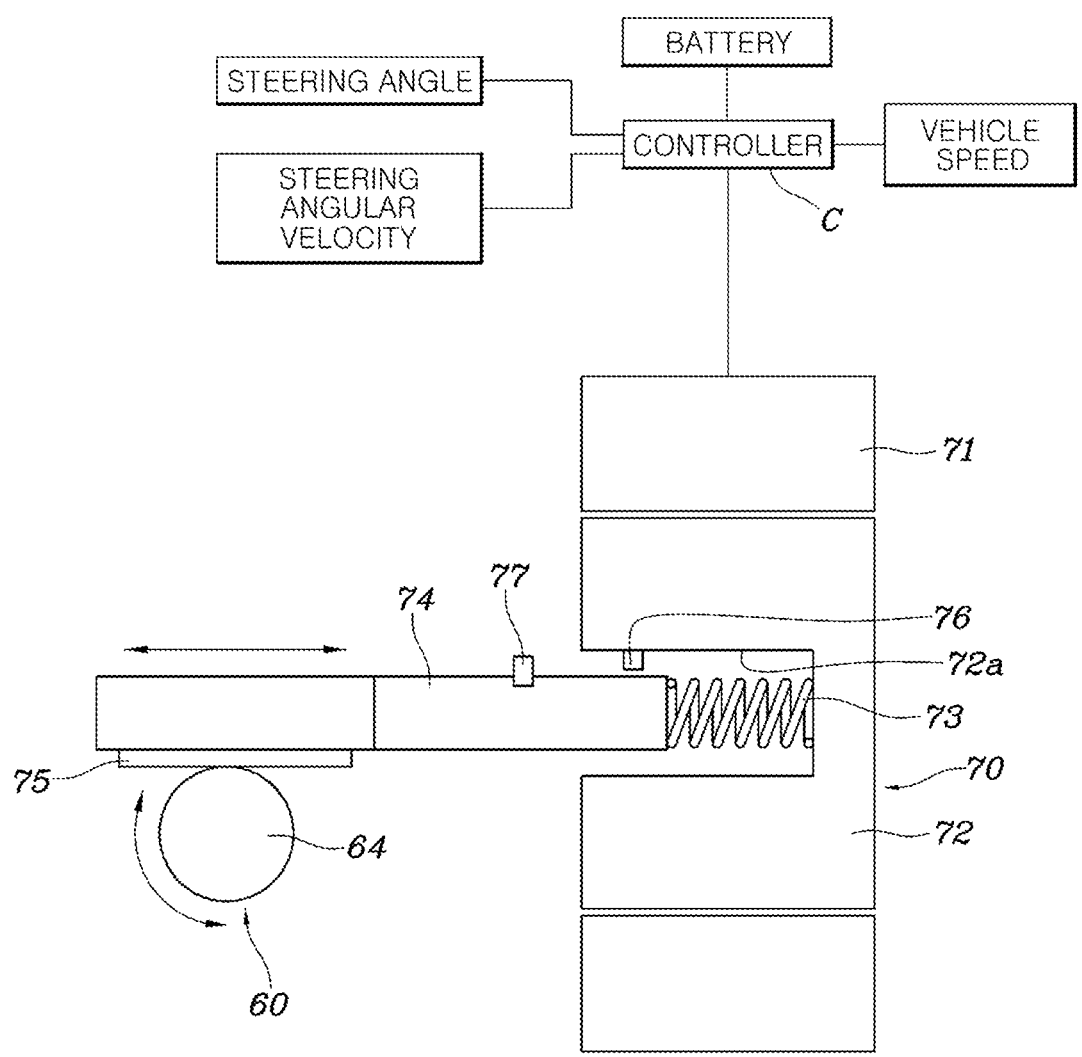
FIG. 3 is a view illustrating a friction-variable operation using a first solenoid in one form of the present disclosure.

Next, referring to FIGS. 2 and 3, the friction actuator serves to provide force desired to move the one end of the tightening means. The friction actuator includes a first solenoid 70 configured such that a movable iron core 74 moves linearly when current is supplied to a coil 71.

For example, a rack gear 75 may be provided at the end of the movable iron core 74, and a pinion gear 64 may be formed at the end of the screw 61. The rack gear 75 and the pinion gear 64 may be engaged with each other such that the screw 61 rotates in response to the linear movement of the movable iron core 74.

The first solenoid 70 includes a fixed iron core 72, the movable iron core 74, and a return spring 73. The fixed iron core 72 extends through the center of the coil 71. A spring hole 72*a* is formed in the center of the fixed iron core 72 such that the movable iron core 74 can move linearly into the spring hole 72*a*.

The return spring 73 is provided between the inner end of the spring hole 72*a* formed in the fixed iron core 72 and the movable iron core 74 to provide elastic restoring force to the movable iron core 74, which has been moved into the fixed iron core 72.

In addition, as shown in FIG. 3, the steering apparatus according to the present disclosure may further include a controller "C" for controlling whether to supply current to the coil 71 of the first solenoid 70 based on steering angle information (e.g. a steering angle and steering angular velocity) of the steering wheel 10 and a vehicle speed input thereto.

Specifically, the controller C may perform control such that current is supplied to the first solenoid 70 when the vehicle speed is equal to or greater than a first reference vehicle speed.

In addition, the controller C may perform control such that current is supplied to the first solenoid 70 when the vehicle speed is less than a second reference vehicle speed, which is lower than the first reference vehicle speed.

That is, under general traveling conditions, an additional frictional member of the ball screw mechanism 60 is not required, whereby a relatively low frictional force of about 0.5 to 0.7 Mm is generated. In this state, the outer circumferential surface of the shaft 40 is simply in tight contact with the inner circumferential surface of the friction member 50.

When more than a predetermined level of frictional force is desired for the steering wheel 10 according to the vehicle driving conditions, current is supplied to the first solenoid 70. As a result, the movable iron core 74 of the first solenoid 70 moves, and the stroke of the nut 62 is changed in response to the stroke of the movable iron core 74, whereby the force of the friction member that fastens the shaft 40 is increased. Consequently, frictional force is applied to the steering wheel 10.

Meanwhile, the steering limitation means of the present disclosure may include a rotation member 30, a first stopper 31, and a second stopper 51.

Figure 4A:
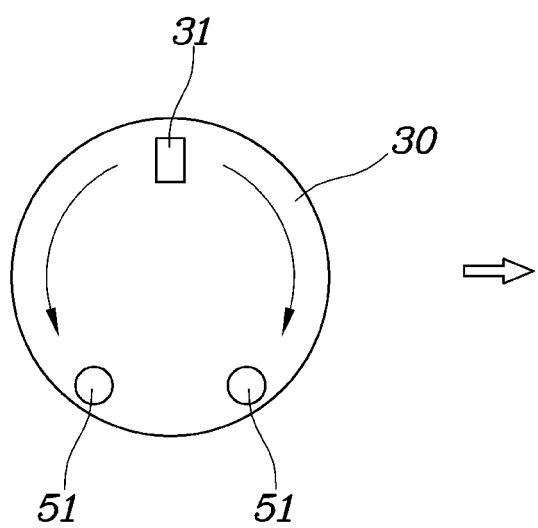
FIGS. 4A and 4B are views illustrating a steering-angle limitation operation in one form of the present disclosure.
Figure 4B:
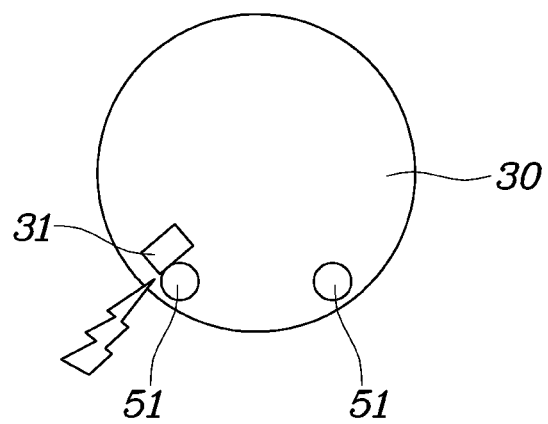

Specifically, referring to FIGS. 1 and 4A-4B, one end of the shaft 40 is axially coupled to the center of the rotation member 30 such that the rotation member 30 is rotatable with the shaft 40. The rotation member 30 faces the friction member 50.

The first stopper 31 protrudes from a predetermined radial position of the rotation member 30 so as to be disposed around the shaft 40, and the second stopper 51 protrudes from the friction member 50 toward the rotation member 30.

The second stopper 51 is located in the movement path of the first stopper 31 to limit the movement of the first stopper 31. Two second stoppers 51 may be provided to individually limit the steering angle of the steering wheel 10 in a left-side full-turn steering state and a right-side full-turn steering state.

In addition, as shown in FIG. 1, a driving member 20 is coupled to the middle of the column 11, to which the steering wheel 10 is coupled, and the driving member 20 and the rotation member 30 may be gear-engaged with each other to realize a predetermined reduction ratio.

That is, in the case in which the steering wheel 10 is fully turned from the neutral position thereof in a specific direction, the steering wheel 10 must be rotated at least 360 degrees. If the first stopper 31 is formed at the driving member 20, the first stopper 31 contacts the second stopper 51 before the steering wheel 10 is fully turned, since the driving member 20 is rotated while having the same rotational displacement as the column 11. As a result, the rotation of the steering wheel 10 is limited.

In the present disclosure, the driving member 20 and the rotation member 30 are gear-engaged with each other so as to provide an appropriate reduction ratio such that the rotation angle of the steering wheel 10 from the neutral position thereof to the full-turn position thereof corresponds to the rotational displacement between the first stopper 31 and the second stopper 51. When the steering wheel 10 is fully turned from the neutral position thereof, therefore, the first stopper 31 contacts the second stopper 51, whereby the rotation of the steering wheel 10 is limited.

Figure 6A:
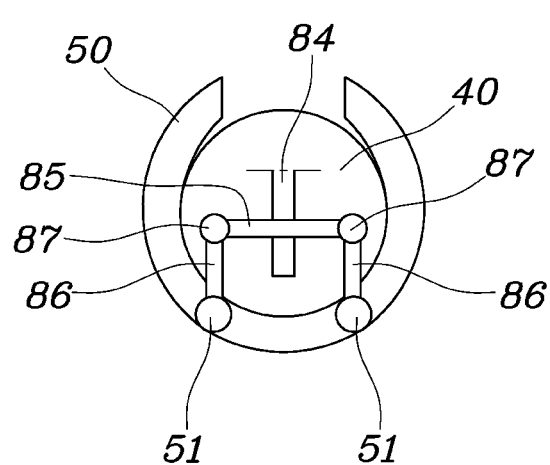
FIGS. 6A and 6B are views showing the movement of a second stopper for the urgent steering-angle limitation operation in one form of the present disclosure.
Figure 6B:
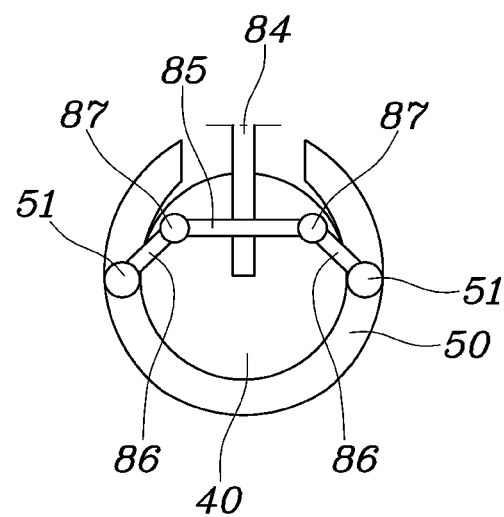

In addition, as shown in FIGS. 6A-6B, the movement path of the first stopper 31 may be defined along the friction member 50, and the second stopper 51 may be movable toward the first stopper 31 in the movement path of the first stopper 31.

An emergency stop actuator may be included to provide force desired to move the second stopper 51.

Figure 5:
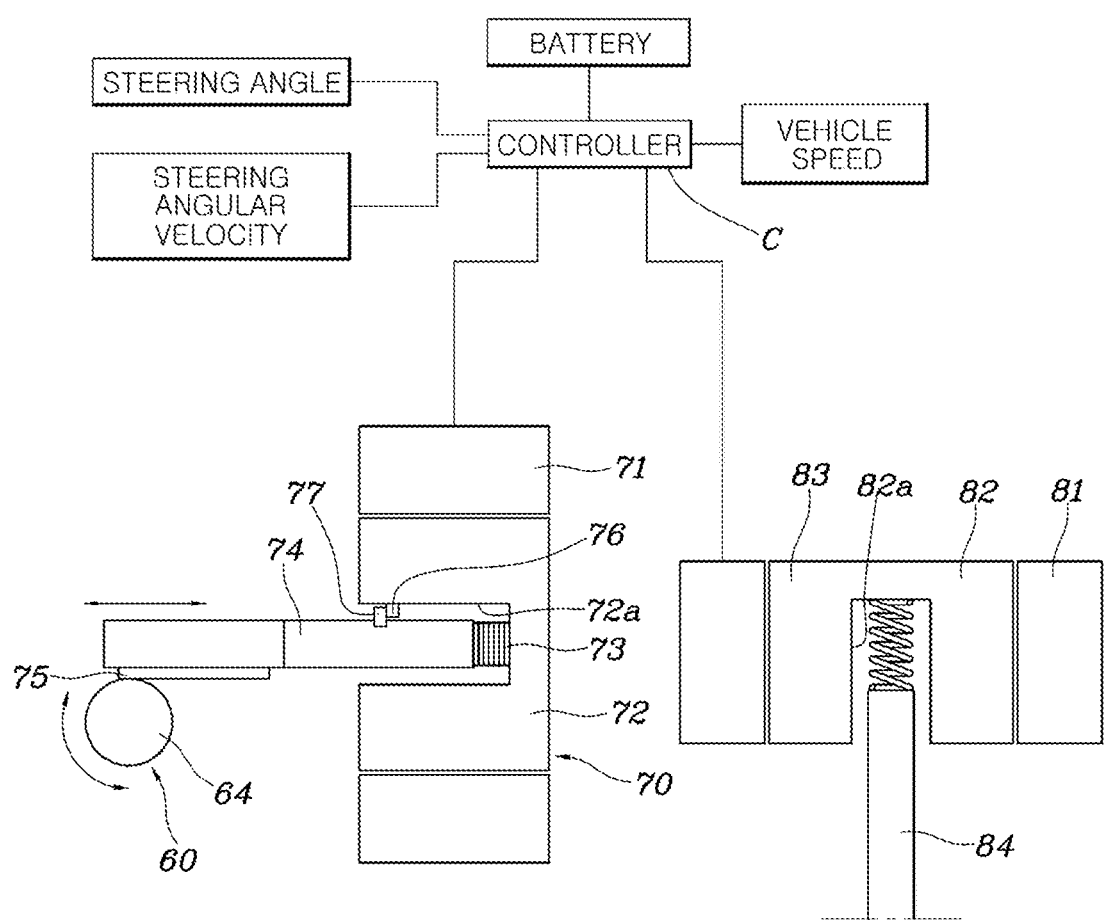
FIG. 5 is a view illustrating an urgent steering-angle limitation operation using the first solenoid and a second solenoid in one form of the present disclosure.

As shown in FIG. 5, the emergency stop actuator includes a second solenoid 80 configured such that a movable iron core 84 moves linearly when current is supplied to a coil 81.

For example, a stationary link 85 may be provided at the end of the movable iron core 84. One end of a rotary link 86 may be connected to the end of the stationary link 85 via a hinge structure 87, and the other end of the rotary link 86 may be connected to the second stopper 51 via a hinge structure 87 such that the second stopper 51 is movable in response to the linear movement of the movable iron core 84.

The second solenoid 80 includes a fixed iron core 82, the movable iron core 84, and a return spring 83. The fixed iron core 82 extends through the center of the coil 81. A spring hole 82a is formed in the center of the fixed iron core 82 such that the movable iron core 84 can move linearly into the spring hole 82a.

The return spring 83 is provided between the inner end of the spring hole 82a formed in the fixed iron core 82 and the movable iron core 84 to provide elastic restoring force to the movable iron core 84, which has been moved into the fixed iron core 82.

In addition, the second solenoid 80 is operable in response to a specific operation of the first solenoid 70. To this end, a movable sensor 77 is provided at the middle of the movable iron core 74 of the first solenoid 70, and a stationary sensor 76 is provided inside the coil 71 of the first solenoid 70. The stationary sensor 76 may be fixed to the inner wall of the spring hole 82a formed in the center of the fixed iron core 72.

In the case in which the difference between the steering angle of the steering wheel 10 and the steering angle of the tires is equal to or greater than a predetermined value and in which the stationary sensor 76 senses the movable sensor 77 as the result of the movement of the movable iron core 74, the controller C may perform control such that current is supplied to the coil 81 of the second solenoid 80.

Hereinafter, the frictional force provision operation in one form of the present disclosure will be described with reference to FIG. 3. Upon determining that it is desired to apply frictional force to the steering wheel 10 based on steering angle information and a vehicle speed input thereto, the controller C performs control such that current is supplied to the first solenoid 70.

When current is supplied to the coil 71 of the first solenoid 70, the movable iron core 74 of the first solenoid 70 moves linearly into the coil 71, whereby the rack gear 75, formed at the movable iron core 74, rotates the pinion gear 64, formed at the screw 61 of the ball screw mechanism 60, and therefore the screw 61 is rotated.

As a result, the nut 62, which is coupled to the screw 61, moves along the screw 61 by a predetermined stroke. At this time, the nut 62 moves toward the support 63, whereby the friction member 50 is narrowed. Consequently, the inner surface of the friction member 50 is pushed to the outer circumferential surface of the shaft 40, whereby frictional force is increased. The increased frictional force may be provided to the steering wheel 10.

Afterwards, under operation conditions in which it is not necessary to apply frictional force to the steering wheel 10, the supply of current to the first solenoid 70 is interrupted. As a result, the movable iron core 74 moves away from the coil 71 due to the elastic restoring force of the return spring 73 in the first solenoid 70, whereby the friction member 50 is widened. Consequently, frictional force is reduced, and therefore there is small friction between the inner surface of the friction member 50 and the outer circumferential surface of the shaft 40.

Hereinafter, the steering-angle limitation operation in one form of the present disclosure will be described. When the steering wheel 10 is rotated in one direction, the column 11, which is coupled to the steering wheel 10, is rotated, and the rotation member 30, which is engaged with the driving member 20, is rotated together with the driving member 20, which is coupled to the column 11.

As a result, as shown in FIGS. 4A-4B, the first stopper 31 is coupled to the rotation member 30 and may move. Since the second stopper 51 is located in the movement path of the first stopper 31, the first stopper 31 is caught by the second stopper 51 at the position at which the steering wheel 10 is fully turned, whereby the rotation of the steering wheel 10 is mechanically limited.

Meanwhile, in the case in which one of the tires collides with a curbstone, the tire may not turn even though the steering wheel 10 is rotated. In this case, it is desired to urgently limit the rotation of the steering wheel 10.

According to the present disclosure, as shown in FIG. 5, in the case in which the difference between the steering angle of the steering wheel 10 and the steering angle of the tires is equal to or greater than a predetermined value during the rotation of the steering wheel 10 and in which the stationary sensor 76 senses the movable sensor 77 as the result of the movement of the movable iron core 74 of the first solenoid 70, the controller C performs control such that current is supplied to the coil 81 of the second solenoid 80.

When current is supplied to the coil 81 of the second solenoid 80, the movable iron core 84 of the second solenoid 80 moves linearly into the coil 81, whereby the rotary link 86 and the second stopper 51 move together with the stationary link 85, which is coupled to the movable iron core 84.

At this time, as shown in FIGS. 6A-6B, the rotary link 86 moves while turning about the hinge structure 87, since the rotary link 86 is coupled to the stationary link 85 and to the second stopper 51 therebetween via the hinge structure 87. As a result, the second stopper 51 moves toward the first stopper 31 while sliding along the friction member 50.

Figure 7A:
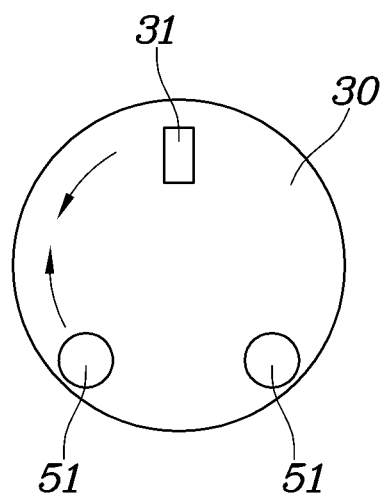
FIGS. 7A and 7B are views showing the operation state of a first stopper and the second stopper according to the urgent steering-angle limitation operation of FIG. 6.
Figure 7B:
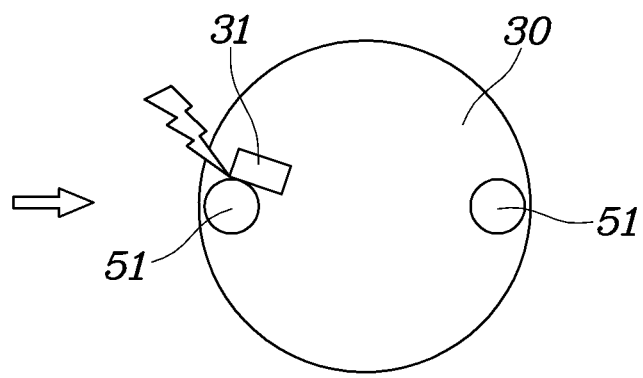

Consequently, the displacement between the first stopper 31 and the second stopper 51 is greatly reduced, whereby the first stopper 31 is caught by the second stopper 51, the movement of which has been completed, as shown in FIGS. 7A-7B. Consequently, the rotation of the steering wheel 10 is urgently limited.

Hereinafter, the control operation for each traveling mode using the steering apparatus of the present disclosure will be described. First, in the case in which a vehicle travels at a high speed, i.e. in the state in which the vehicle speed is equal to or greater than a predetermined level, current is supplied to the first solenoid 70 in order to increase the frictional force of the system.

That is, under high-speed traveling conditions, it is important to heavily control the steering wheel 10 in the state in which the steering angle is neutral. Consequently, mechanical frictional force is increased such that the steering sense of a driver is heavy in the state in which the steering angle is neutral.

Even in the case in which the vehicle travels at a low speed, i.e. in the state in which the vehicle speed is less than the predetermined level, current is supplied to the first solenoid 70 in order to increase the frictional force of the system.

For example, on the assumption that the steering wheel 10 is rotated 360 degrees in the state in which a vehicle equipped with a conventional steering system is stopped, the steering wheel 10 returns about 20 degrees due to self-alignment when the driver releases the steering wheel 10.

In the SBW system, however, when the driver releases the steering wheel 10, the steering wheel 10 may return to the position at which the steering angle is neutral due to the reaction torque of the reaction motor M, since the frictional force applied to the steering wheel 10 is low.

In the present disclosure, current is supplied to the first solenoid 70 in order to provide frictional force corresponding to the frictional force of the tires, whereby the steering wheel 10 is inhibited or prevented from returning to the position at which the steering angle is neutral. Consequently, steering behavior similar to that of a vehicle equipped with a conventional steering system is achieved.

As is apparent from the above description, the present disclosure has the effect of providing frictional force desired for a steering wheel for each traveling condition through a structure for changing frictional force and supplying the changed frictional force to the steering wheel, thereby improving the steering sense and reproducing behavior similar to that of a conventional steering system.

In addition, the present disclosure has the effect of urgently limiting the rotation of the steering wheel under specific driving conditions, for example, in the state in which one of the tires collides with a curbstone, through a structure for variably limiting the rotation range of the steering wheel and of allowing the reverse rotation of the steering wheel in order to inhibit or prevent the occurrence of reverse locking of the steering wheel in the case in which rotation of the steering wheel is limited, thereby avoiding a dangerous situation in which steering becomes impossible.

Although the exemplary forms of the present disclosure have been described above with reference to the accompanying drawings, those skilled in the art will appreciate that the present disclosure can be implemented in various other forms without changing the technical ideas or features thereof.

What is claimed is:

1. A steering apparatus of a steer-by-wire (SBW) system, the steering apparatus comprising:
    a shaft rotatably interlocked with a steering wheel;
    a friction member configured to surround the shaft and to contact the shaft;
    a frictional force provision means configured to narrow and widen the friction member in a radial direction of the shaft and configured to change a frictional force of the friction member that contacts the shaft;
    a steering limitation means configured to regulate rotation of the shaft by a stopper provided at the friction member during the rotation of the shaft and configured to limit steering of the steering wheel,
    wherein the friction force provision means comprises a friction actuator including a first solenoid which comprises a movable iron core configured to move linearly,
    wherein the steering limitation means comprises:
        a rotation member having a center axially coupled to one end of the shaft such that the rotation member is rotatable with the shaft, the rotation member being located so as to face the friction member;
        a first stopper protruding from a predetermined radial position of the rotation member so as to be disposed around the shaft; and
        a second stopper protruding from the friction member toward the rotation member, the second stopper being located in a movement path of the first stopper and configured to limit a movement of the first stopper; and
    an emergency stop actuator configured to provide a force to move the second stopper,
    wherein the emergency stop actuator comprises a second solenoid including a movable iron core configured to move linearly when current is supplied to a coil of the second solenoid, and
    wherein a stationary link is connected to an end of the movable iron core of the second solenoid, one end of a rotary link is connected to an end of the stationary link via a hinge structure, and other end of the rotary link is connected to the second stopper via a hinge structure such that the second stopper is movable in response to linear movement of the movable iron core of the second solenoid.

2. The steering apparatus according to claim 1, wherein the frictional force provision means comprises:
    a tightening means connected to opposite ends of the friction member, a first end of the tightening means being moved in a state in which a second end of the tightening means is fixed and configured to narrow and widen the friction member, and
    wherein the friction actuator is configured to provide a force to move the first end of the tightening means.

3. The steering apparatus according to claim 2, wherein the tightening means comprises a ball screw mechanism connected to the opposite ends of the friction member,
    wherein the ball screw mechanism includes;
        a screw configured to rotate; and
        a nut configured to move linearly in response to a rotation of the screw, and
    wherein a support of the ball screw mechanism is connected to the first end of the friction member, and the nut of the ball screw mechanism is connected to the second end of the friction member, whereby the nut moves linearly in response to the rotation of the screw to change the frictional force of the friction member that contacts the shaft.

4. The steering apparatus according to claim 1, further comprising: a controller configured to determine whether to supply a current to a coil of the first solenoid based on steering angle information of the steering wheel and a vehicle speed input thereto.

5. The steering apparatus according to claim 4, wherein the controller is configured to:
    supply the current to the first solenoid when the vehicle speed is equal to or greater than a first reference vehicle speed; and
    supply the current to the first solenoid when the vehicle speed is less than a second reference vehicle speed, which is less than the first reference vehicle speed.

6. The steering apparatus according to claim 1, wherein a driving member is coupled to a column to which the steering wheel is coupled, and
    the driving member and the rotation member are gear-engaged with each other to realize a predetermined reduction ratio.

7. The steering apparatus according to claim 1,
    wherein the movement path of the first stopper is defined along the friction member, and the second stopper is movable toward the first stopper in the movement path of the first stopper.

8. The steering apparatus according to claim 1, wherein the second solenoid comprises:
    a fixed iron core provided in a center of the coil of the second solenoid; and
    a return spring provided between the fixed iron core and the movable iron core of the second solenoid and configured to provide an elastic restoring force to the movable iron core that has been moved toward the fixed iron core of the second solenoid, wherein the movable iron core of the second solenoid moves linearly in a center of the fixed iron core of the second solenoid.

9. The steering apparatus of claim 1, further comprises:

a movable sensor provided at a middle of the movable iron core of the first solenoid;

a stationary sensor provided inside a coil of the first solenoid; and a controller configured to supply current to the coil of the second solenoid when a difference between a steering angle of the steering wheel and a steering angle of tires is equal to or greater than a predetermined value and when the stationary sensor senses the movable sensor as a result of the movement of the movable iron core of the first solenoid.

10. The steering apparatus according to claim 1, wherein the movable iron core of the first solenoid is configured to move linearly when current is supplied to a coil of the first solenoid, wherein a rack gear is provided at an end of the movable iron core of the first solenoid, and a pinion gear is formed at an end of a screw, and wherein the rack gear and the pinion gear are engaged with each other such that the screw rotates in response to linear movement of the movable iron core of the first solenoid.

11. The steering apparatus according to claim 10, wherein the first solenoid further comprises:

a fixed iron core provided in a center of the coil of the first solenoid; and a return spring provided between the fixed iron core and the movable iron core and configured to provide an elastic restoring force to the movable iron core, which has been moved toward the fixed iron core, wherein the movable iron core of the first solenoid moves linearly in a center of the fixed iron core.

\* \* \* \* \*